March 17, 1959  J. N. DUPREE  2,877,584
MULTIPLE INDICATOR FOR INSTRUMENT PANELS AND THE LIKE
Filed July 11, 1955  2 Sheets-Sheet 1
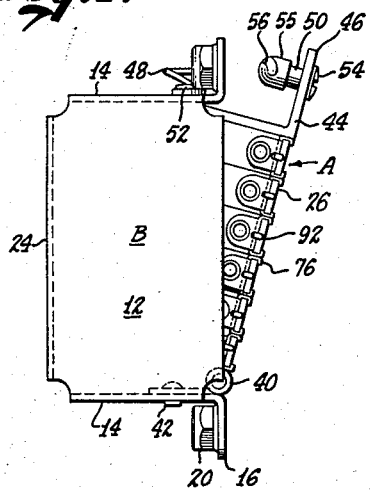
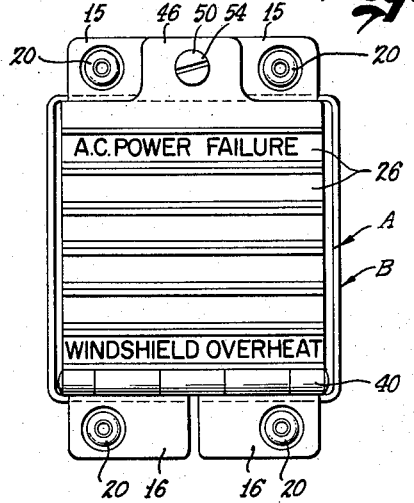
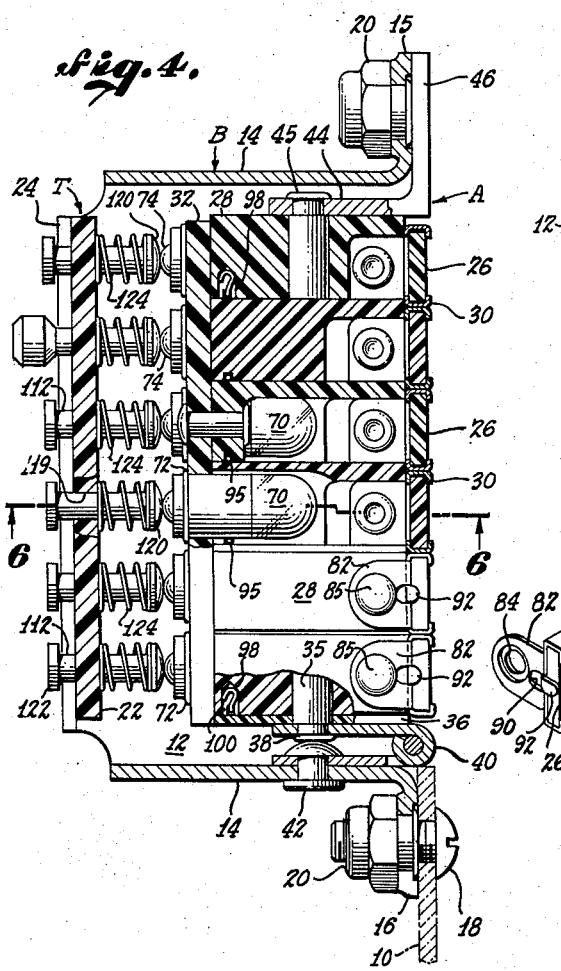
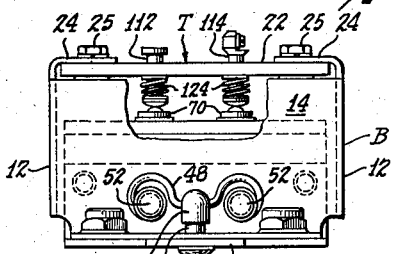
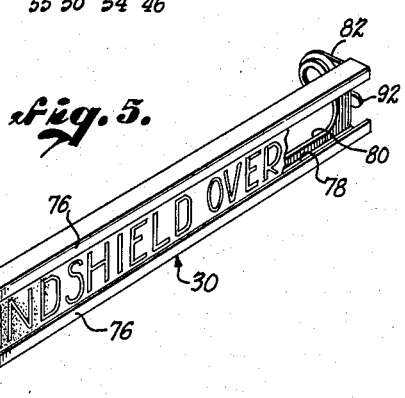
JAMES N. DUPREE,
INVENTOR.
BY George J. Smyth
ATTORNEY.

March 17, 1959 J. N. DUPREE 2,877,584
MULTIPLE INDICATOR FOR INSTRUMENT PANELS AND THE LIKE
Filed July 11, 1955 2 Sheets-Sheet 2
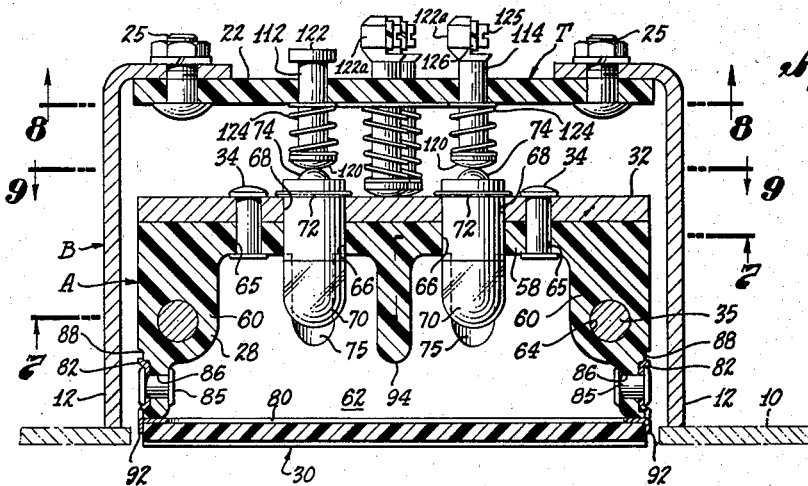
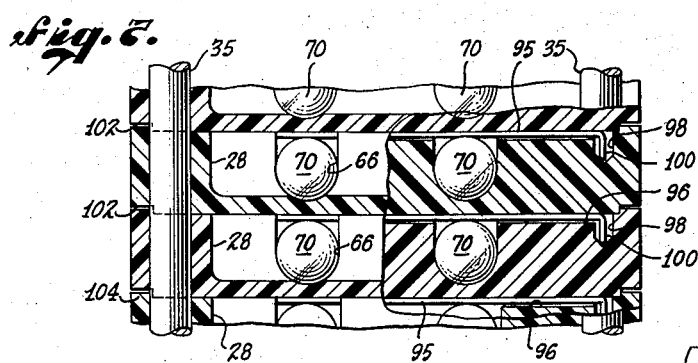
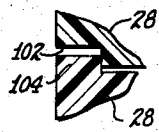
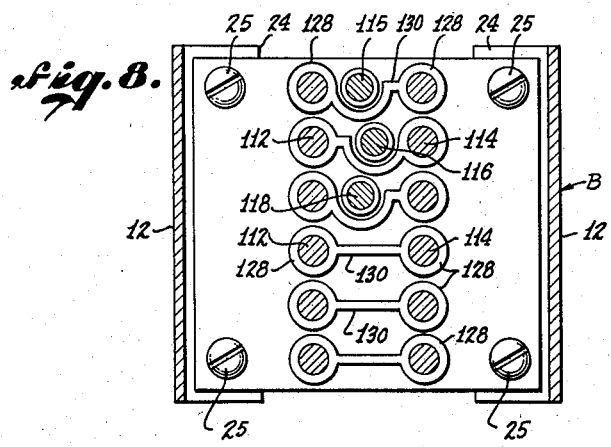
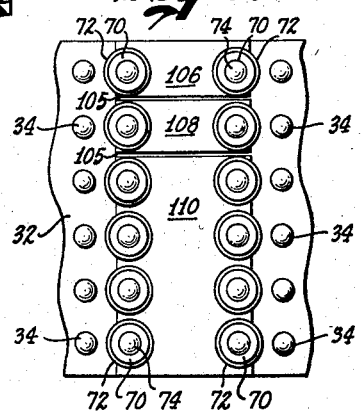
JAMES N. DUPREE,
INVENTOR.
BY *George T. Smyth*
ATTORNEY.

United States Patent Office 2,877,584
Patented Mar. 17, 1959

2,877,584

MULTIPLE INDICATOR FOR INSTRUMENT PANELS AND THE LIKE

James N. Dupree, Hollywood, Calif., assignor to California Plasteck, Inc., Los Angeles, Calif., a corporation Application July 11, 1955, Serial No. 521,134

1 Claim. (Cl. 40—132)

This invention relates to indicating and warning devices, with special reference to devices of this type having multiple panels with lettering or other indicia thereon for illumination selectively by remote control.

The invention has been initially embodied in a multiple indicating device known as an annunciator for use on an aircraft instrument panel to indicate the condition or operating state of various components in the aircraft system. This initial embodiment is described herein by way of example for the purpose of disclosure and will provide adequate guidance for those skilled in the art who may have occasion to apply the same principles to other specific purposes.

One feature of this embodiment of the invention is the concept of mounting an assembly of indicator units in an outlet box in a removable manner. The indicator units have forward transparent walls with appropriate letters or indicia thereon for selective illumination by means of lamps in the compartments. Removal of the assembly of indicator units from the outlet box makes the various lamps accessible for convenient replacement when required.

Circuits for energizing the lamps include the contacts of the lamps and the separate contacts of a terminal assembly on the back of the assembly that normally touch corresponding contacts carried by a permanently wired terminal assembly at the back of the outlet box. Thus removing the indicator assembly exposes both of these sets of contacts for inspection. In the preferred practice of the invention, the indicator assembly is hingedly mounted on the outlet box to swing between open and closed positions.

Another feature of the invention is simplicity of structure as well as reduction of cost, these two ends being achieved, in part, by using hollow molded bodies for the individual indicator units and, in part, by using a printed circuit technique. It is a simple matter to assemble hollow molded bodies side by side to form the series of lamp compartments. The required circuit components, including some of the aforementioned contacts, may be provided by a printed circuit technique both on the back of the indicator assembly and on the cooperating front of the terminal assembly. Further simplification is provided by the use of short, easily installed retaining wires to secure the individual lamps frictionally when the indicator assembly is swung away from its normal closed position.

The preferred embodiment of the invention is further characterized by unusual compactness. The use of printed circuit components contributes to this end. Another feature in this regard is a staggered arrangement of contacts as will be explained.

A further feature of the preferred practice of the invention is the use of two lamps in each of the indicator units with a special baffle or light barrier extending forwardly between the two lamps for a sufficient distance to cause the corresponding lettered panel to be partially dimmed at one end in the event that one of the lamps fails. The dimming action is so highly noticeable as to inform the observer in an unmistakable manner that the corresponding lamp has failed but, nevertheless, the dimming is not of such degree as to make the indicia illegible.

The various features and advantages of the invention will be apparent in the following detailed description, considered with the accompanying drawings.

In the drawings, which are to be regarded as merely illustrative:

Figure 1 is a side elevation of the presently preferred embodiment of the invention showing the hinged indicator assembly partially swung out of its normal closed position in the outlet box;

Figure 2 is a front elevation of the device with the hinged indicator assembly in its normal closed position;

Figure 3 is a plan view of the same device with a portion broken away to show concealed structure;

Figure 4 is an enlarged view of the device, partly in side elevation, and partly in vertical section;

Figure 5 is a perspective view of one of the several channel members that are incorporated in the device to hold strips or plates of light-transmitting material with indicia thereon;

Figure 6 is a transverse section taken as indicated by the line 6—6 of Figure 4 showing how the contacts of the indicator assembly cooperate with the contacts of a terminal assembly at the back of the outlet box;

Figure 7 is an enlarged fragmentary section taken as indicated by the broken line 7—7 of Figure 6 showing how the molded bodies are held together in a row to form the indicator assembly;

Figure 7a is an enlarged portion of Figure 7;

Figure 8 is a section taken as indicated by line 8—8 of Figure 6, showing the construction of the terminal assembly; and Figure 9 is a fragmentary rear elevational view of the indicator assembly as seen along the broken line 9—9 of Figure 6.

The drawings illustrating the presently preferred embodiment of the invention show an assembly of indicator units, which assembly is generally designated by the letter A. This indicator assembly A is mounted in an outlet box B in normal abutment against a terminal assembly that is generally designated by the letter T.

The outlet box B which is adapted to be mounted on an instrument panel 10 may be made of metal or other suitable material and is open both at the front and at the back. Thus the outlet box B has two side walls 12 and two opposite end walls 14. Each of the end walls 14 has a pair of ears integral therewith to permit the outlet box to be mounted on the instrument panel 10 from the rear, there being two upper ears 15 and two lower ears 16. As best shown in Figure 4, these ears are intended to be attached to the inner side of the instrument panel 10 by suitable screws 18 and special bushings or nuts 20.

The terminal assembly T comprises a plurality of components mounted on a plate 22 of non-conducting material, which plate in effect forms a back wall closing the open back of the outlet box B. In the present construction, as best shown in Figures 3 and 4, the side walls 12 of the outlet box B are formed with inwardly turned rear flanges 24 and the plate 22 is attached to these rear flanges by suitable screws and nuts 25.

Each of the individual units of the indicator assembly A has a forward wall in the form of a strip or plate 26 of light-transmitting material which carries suitable indicia and each of the units has at least one lamp to illuminate the indicia plate. Preferably the indicia plate 26 is made of darkly colored translucent plastic material, the color being, for example, dark red or dark green.

In the present construction, each of the indicator units comprises a hollow molded body, generally designated by numeral 28, with a sheet metal channel member 30 riveted thereto, the purpose of the sheet metal channel being to retain the corresponding indicia plate 26. All of these hollow bodies 28 are arranged in a row side by side and are interconnected by a back plate 32 of nonconducting material, the individual box being united to the back plate by suitable rivets 34. In addition the molded bodies 28 are interconnected by a pair of tie rods 35 with an end plate 36 of plastic material at the bottom end of the row. The lower ends of the two tie rods 35 extend through the end plate 36 into one leaf of a hinge 40 and are anchored thereto by peening 38, the second leaf of the hinge being attached by rivets 42 to the corresponding end wall 14 of the outlet box B. Thus the unit assembly A may be swung into and out of a normal position in the outlet box B. Figure 4 shows the normal closed position of the indicator assembly in the outlet box B and Figure 1 shows the indicator assembly swung partially out of the outlet box. The upper ends of the two tie rods 35 extend into an angle member 44 and are secured thereto by peening 45. The angle member 44 provides an upwardly extending ear 46 which may be adapted in any suitable manner for releasable connection to the upper outlet box ears 15.

In the present construction, the ear 46 of the indicator assembly is releasably attachable to the outlet box B by means of a suitable spring wire 48 in cooperation with a special latch member 50. The two ends of the spring wire 48 are anchored by spaced rivets 52 on the upper end wall 14 of the outlet box. The latch member 50 is rotatably mounted in the ear 46 of the indicator assembly and has a slotted head 54 to receive a screw driver for rotation thereof. The inner end of the latch member 50 is enlarged to form an inner head 55 and this inner head 55 has a helical slot 56 to form a rotary hook for engaging the spring wire 48. In a well known manner the latch member 50 may be rotated clockwise into hook engagement with the spring wire 48 and may be rotated counter-clockwise to release the wire. The rotary engagement of the latch member 50 with the spring wire 48 pulls the spring wire forward whereby the spring wire normally exerts a continuous inward force on the closed indicator assembly A to preclude vibration of the indicator assembly relative to the outlet box B.

Each of the molded bodies 28, which may be made of any suitable non-conducting plastic material, has a back wall 58, two thickened end walls 60 and a forwardly extending side wall 62, the opposite side of the hollow body as well as the front end of the hollow body being open. Each of the molded bodies 28 except the end body near the hinge 40 is closed on its open side by the adjacent body, the end body being closed by the previously mentioned end plate 36. As best shown in Figure 6, the two thickened end walls 60 of each of the bodies 28 has a pair of apertures 64 therein to receive the two tie rods 35 and the back wall 58 has a pair of apertures 65 to receive the previously mentioned rivets 34.

The back wall 58 of each of the molded bodies 28 also has a pair of spaced lamp openings 66 in the form of recesses that are open on the open side of the hollow body. Each of the lamp openings 66 in a hollow body 28 matches a corresponding aperture 68 in the previously mentioned back plate 32, the arrangement being such that a pair of lamp bulbs 70 may be inserted into each hollow body into a position with the circumferential rib 72 of the base of the lamp bulb in abutment with the back face of the back plate 32. The base rib 72 serves as a circumferential contact for the lamp bulb, the lamp bulb also having the usual central end contact 74. The base rib 72 may be termed the first contact of the lamp and the end contact 74 may be termed the second contact of the lamp. In the construction shown, each of the lamp openings 66 extends into the plane of the side wall 62 of the molded body and a shallow groove 75 is formed in the side wall opposite each of the lamp apertures to avoid interference with the insertion of a lamp bulb.

The previously mentioned channel member 30 that is mounted across the front end of each of the hollow bodies 28 has overhanging flanges 76, as best shown in Figure 5, to form a channel 78 to receive and retain a previously mentioned indicia plate 26. The back of the channel member 30 has an elongated opening 80 to permit light from the interior of the hollow body to reach the indicia plate 26 throughout the length of the plate. The channel member 30 has integral ears 82 at its opposite ends which are formed with counter-sunk apertures 84.

As best shown in Figure 6, each of the channel members 30 is mounted on the corresponding hollow body 28 by means of suitable rivets 85, the rivets extending through one of the counter-sunk ear apertures 84 and through matching apertures 86 in the end walls of the hollow body. Preferably the end walls 60 of the hollow bodies 28 are formed with outer recesses 88 so that the rivets 85 lie inside the planes of the outer surfaces of the end walls, as may be seen in Figure 6. The two ears 82 at the opposite ends of each channel member 30 are lanced as indicated at 90 in Figure 5 to form corresponding pliable tongues 92. These tongues 92 are normally bent to the positions shown for retaining abutment against the opposite ends of the corresponding indicia plate 26.

Preferably each of the hollow bodies 28 is formed with what may be termed a light barrier or baffle 94 that extends forward between the two corresponding lamp bulbs 70, as shown in Figure 6. This light baffle does not completely span the lamp compartment and thus permits adequate illumination of the whole length of the corresponding indicia plate 26 by either of the two lamp bulbs 70. If one of the lamp bulbs 70 fails, however, the corresponding end of the indicia strip 26 is dimmed or darkened in a highly noticeable manner without making the indicia illegible. Thus each lamp compartment is provided with two lamp bulbs for safety, and failure of either one of the two lamp bulbs is brought to the attention of the observer whenever the corresponding lamp circuit is energized.

Preferably, suitable means is provided to yieldingly or frictionally retain the lamp bulbs 70 in place when the indicator assembly A is swung open. In the present practice of the invention, a short length of fine spring wire 95 is mounted on each of the molded bodies 28 across the two lamp openings 66 for this purpose. As shown in Figures 4 and 7, each of the wires 95 lies in a shallow groove 96 in the corresponding molded body 28 and is bent at its two ends to enter corresponding blind bores 98 in the hollow body.

As best shown in Figure 4, the ends of the wires in the bores 98 are formed into hooks 100 which in their unstressed state are wider than the diameter of the bores 98. The advantage of this arrangement is that the wires 95 may be formed by automatic machinery and then may be mounted on each of the molded bodies 28 simply by forcing the hooks 100 at the ends of the wires into the blind bores 98. These wires press lightly against the base portions of the lamp bulbs 70 to provide sufficient friction to hold the lamp bulbs in place when the lamp assembly is swung out of its closed position on the hinge 40.

Preferably, the molded bodies 28 interlock with each other for correct alignment. For this purpose, as best shown in Figures 7 and 7a, the closed side of each of the hollow bodies 28 may be formed with recesses 102 at the opposite ends thereof and the open side of each of the bodies may be formed with corresponding end ribs 104 for interlocking engagement with the recesses 102.

The recesses 102 are preferably slightly deeper than the end ribs 104 so that the end ribs do not keep the molded bodies from making intimate face-to-face contact with each other.

As best shown in Figure 9, the back face of the back plate 32 of the indicator assembly A has a layer of conducting material applied thereto for electrical interconnection of the two lamp bulbs 70 of each of the pairs of lamp bulbs. In this instance, the layer of conducting material is broken by two gaps 105 to form two conducting layers 106 and 108 of relatively small area for the upper two pairs of lamps, respectively, and a conducting layer 110 of larger area for the remainder of the lamps. Since the circumferential base ribs 72 that serve as contacts for the lamps 70 abut the conducting layers 106, 108 and 110, it is apparent that the conducting layers interconnect each of the two lamps 70 of each of the pairs of lamps in parallel.

The terminal assembly T comprises a plurality of suitable contacts mounted on the non-conducting plate 22 to cooperate with the end contacts 74 of the various lamp bulbs 70 and to cooperate with the three conducting layers 106, 108 and 110 respectively. As best shown in Figures 4 and 8, there is a pair of contacts comprising a contact 112 and a contact 114 for each of the pairs of lamp bulbs 70 and these pairs of contacts 112 and 114 are arranged in two rows. In addition there is a contact 112 to cooperate with the conducting layer 106, a contact 116 to cooperate with the conducting layer 108, and a contact 118 to cooperate with the larger conducting layer 110.

Each of these various contacts 112, 114, 115, 116 and 118 of the terminal assembly is in the form of a plunger that is slidingly mounted in a corresponding aperture 119 in the plate 22, the plunger having a forward contact head 120 and a rearward stop head 122. These plungers are yieldingly urged towards the indicator unit assembly A by corresponding coiled springs 124, each spring being in compression between the corresponding contact head 120 and the forward face of the terminal assembly plate 22. Each of the contacts 114 as well as the three contacts 115, 116 and 118 is adapted for a permanent wiring and for this purpose may be formed with a special stop head 122, best shown in Figure 6, to permit a circuit wire (not shown) to be attached thereto by means of a screw 125 and washer 126.

As shown in Figure 8, conducting material is bonded to the forward face of the terminal assembly plate 22 to provide electrical interconnection of the two contacts of each of the pairs of contacts 112 and 114. For this purpose, a ring 128 of conducting material surrounds each of the apertures 119 in which the contacts 112 and 114 are mounted and these rings are interconnected in pairs by narrow strips 130 of the same conducting material. Thus, the two contacts of each of the pairs of contacts are interconnected by virtue of the fact that their corresponding coiled springs 124 press against common conducting material. With reference to compactness, it will be noted that the three contacts 115, 116 and 118 are arranged in a staggered row and that the adjacent conducting strips 130 offset from these contacts.

The manner in which the described invention serves its purpose may be readily understood from the foregoing description. The circuit for energizing the upper pair of lamp bulbs 70, for example, may be traced as follows: a circuit wire (not shown) to the contact 115 of the terminal assembly, the layer of conducting material 106 against which the contact 115 is pressed by its coiled spring 124, the two circumferential base ribs 72 of the two lamp bulbs 70, and the end contacts 74 of the two lamp bulbs. One of these two end contacts 74 touches the corresponding contact 114 of the terminal assembly which is directly connected to a second circuit wire (not shown); the other end contact 74 is connected to the same circuit wire by a conducting path which includes the contact 112 the corresponding spring 124, the corresponding conducting material on the forward face of the plate 22 comprising two conducting rings 128 and the inner connecting strip 130, and the spring 124 of the right hand contact 114. In like manner, contact 116 may be connected by a wire (not shown) to one side of a circuit for energizing a second pair of lamps 70, and contact 118 may be connected to one side of a circuit to energize the remaining pairs of lamps.

If any lamp bulb fails, the corresponding end portion of the corresponding indicia plate 26 is consequently dimmed to call attention to the need for a lamp bulb replacement. The replacement of a lamp bulb is a simple matter since it is merely necessary to rotate the latch member 54 counter-clockwise with a screw-driver to free the latch member from the wire 48 thereby to permit the indicator assembly A to be swung open on the hinge 40. In the normal closed position of the indicator assembly A shown in Figure 4, the various coiled springs 124 of the terminal assembly hold the lamp bulbs 70 in place. The contact springs are not effective for this purpose when the indicator assembly A is swung forward. The series of short wires 95 that press against the periphery of the various lamp bulbs serve, however, to keep the lamp bulbs 70 in place when the indicator assembly is swung forward. It is a simple matter to lift a faulty lamp bulb 70 out of the assembly and to insert a new lamp bulb.

It is apparent that any of the indicia plates 26 may be readily replaced. For this purpose, the indicator assembly is swung open and one of the two flexible tongues 92 that abut the indicia plate is bent out of the way to permit the indicia plate to be removed and replaced. The tongue may then be bent back to its normal retaining position.

Although the now preferred embodiment of the present invention has been shown and described herein, it is to be understood that the invention is not to be limited thereto, for it is susceptible to changes in form and detail within the scope of the appended claim.

I claim:

In a device of the character described, an assembly of hollow indicating units comprising: a plurality of elongating hollow bodies positioned side by side in a row, each of said bodies being open on one side whereby a side wall of one body in the row closes the open side of the next adjacent body, each of said bodies being open at the front and being provided with parallel channels along the open front, each of said bodies having a back wall with two apertures therein spaced longitudinally thereof for mounting a pair of spaced lamps inside the body; a light-transmitting indicia plate removably mounted in the parallel channels of each of said bodies; and means interconnecting the bodies in said row to unify the assembly, each of said bodies having a light-barrier between said two apertures extending forward from the back wall of the body and terminating short of the indicia plate carried by the body whereby partial dimming of one end portion of said indicia plate indicates that one of the two lamps in said two apertures is not functioning.

References Cited in the file of this patent

UNITED STATES PATENTS

| | | |
|---|---|---|
| 1,304,423 | Walker | May 20, 1919 |
| 1,349,191 | Duncomb | Aug. 10, 1920 |
| 1,554,570 | Gatchet | Sept. 22, 1925 |
| 1,879,801 | Graham et al. | Sept. 27, 1932 |
| 1,896,545 | Jirka et al. | Feb. 7, 1933 |
| 1,960,636 | Knotz | May 29, 1934 |
| 2,041,589 | Bowers | May 19, 1936 |
| 2,154,109 | Parks | Apr. 11, 1939 |
| 2,681,980 | Harrington | June 22, 1954 |

FOREIGN PATENTS

| | | |
|---|---|---|
| 154,884 | Australia | Jan. 22, 1954 |